United States Patent
Aiba

(10) Patent No.: US 10,748,292 B2
(45) Date of Patent: Aug. 18, 2020

(54) IMAGE SIGNAL DETECTION DEVICE

(71) Applicant: JVC KENWOOD CORPORATION, Yokohama-shi, Kanagawa (JP)

(72) Inventor: Hideki Aiba, Yokohama (JP)

(73) Assignee: JVC KENWOOD CORPORATION, Yokohama-Shi, Kanagawa ( * ) Notice: Subject to any disclaimer, the term of this patent is extended or adjusted under 35 U.S.C. 154(b) by 0 days.

(21) Appl. No.: 16/439,142

(22) Filed: Jun. 12, 2019

(65) Prior Publication Data
US 2019/0387233 A1    Dec. 19, 2019

(30) Foreign Application Priority Data

Jun. 13, 2018    (JP) .................................. 2018-112439

(51) Int. Cl.
*G06T 7/194* (2017.01)
*H04N 19/139* (2014.01)
(Continued)

(52) U.S. Cl.
CPC .............. *G06T 7/194* (2017.01); *G06T 7/223* (2017.01); *H04N 19/139* (2014.11);
(Continued)

(58) Field of Classification Search
CPC ....... G06T 7/194; G06T 7/223; H04N 19/223; H04N 19/527; H04N 19/577
See application file for complete search history.

(56) References Cited

U.S. PATENT DOCUMENTS 9,916,662 B2 * 3/2018 Raburn ...................... G06T 7/11
2011/0142289 A1 * 6/2011 Barenbrug .............. G06T 7/223
382/107
(Continued)

FOREIGN PATENT DOCUMENTS

JP    2008-78857 A    4/2008

OTHER PUBLICATIONS

H.W. Eng & K.K. Ma, "Bidirectional Motion Tracking for Video Indexing", 3 Int'l Workshop on Multimedia Signal Processing 153-158 (1999) (Year: 1999).*
(Continued)

*Primary Examiner* — David N Werner
(74) *Attorney, Agent, or Firm* — Nath, Goldberg & Meyer; Jerald L. Meyer

(57) ABSTRACT

A first motion vector detecting unit calculates a first matching error by detecting a first motion vector based on a first frame and a second frame. A second motion vector detecting unit calculates a second matching error by detecting a second motion vector based on the second frame and a third frame. A local determining unit determines whether a discontinuously moving object is present in a continuously moving background, based on an absolute difference value between the first motion vector and the second motion vector, and the first and second matching errors. An integrating unit integrates determination values for each block within a frame. A determining unit determines whether an image signal is a specific moving image in which the discontinuously moving object is present in a continuously moving background, based on a pattern of integrated values of at least two frames.

5 Claims, 10 Drawing Sheets

(51) Int. Cl.
*G06T 7/223* (2017.01)
*H04N 19/577* (2014.01)
*H04N 19/527* (2014.01)
*H04N 5/14* (2006.01)

(52) U.S. Cl.
CPC ......... *H04N 19/527* (2014.11); *H04N 19/577* (2014.11); *H04N 5/145* (2013.01)

(56) References Cited

U.S. PATENT DOCUMENTS

| | | | | |
|---|---|---|---|---|
| 2012/0275706 A1* | 11/2012 | Lesellier | ................ | G06T 7/194 |
| | | | | 382/195 |
| 2014/0098999 A1* | 4/2014 | U S et al. | ............... | G06T 7/194 |
| | | | | 382/107 |
| 2015/0294179 A1* | 10/2015 | Fang | .................... | G06T 3/4007 |
| | | | | 382/199 |

OTHER PUBLICATIONS

R. Ewerth, M. Schwalb, P. Tessmann, & B. Freisleben, "Segmenting Moving Objects in MPEG Videos in the Presence of Camera Motion", 14 Int'l Conf. on Image Analysis & Processing 819-824 (2007) (Year: 2007).*

* cited by examiner

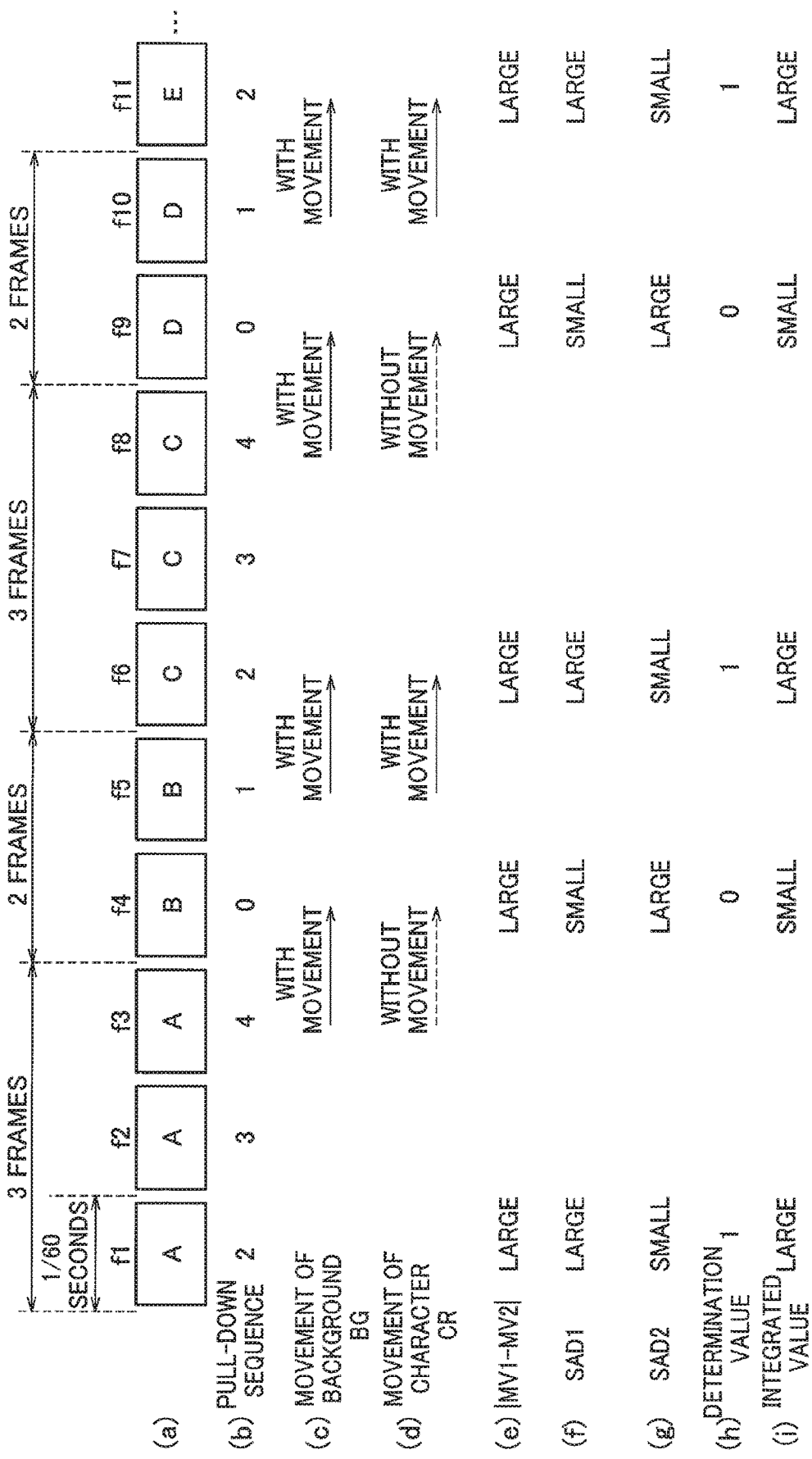

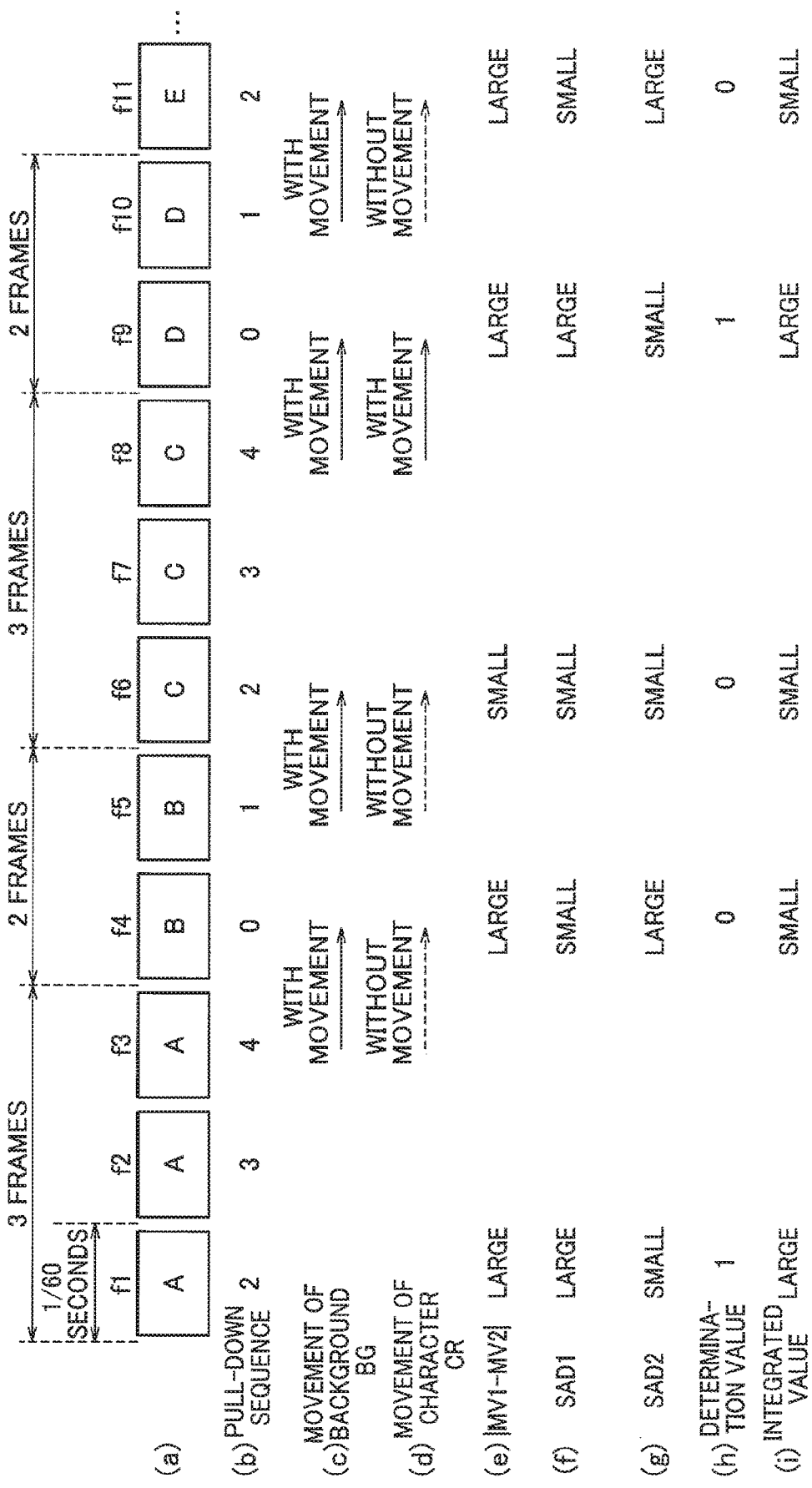

IMAGE SIGNAL DETECTION DEVICE

CROSS REFERENCE TO RELATED APPLICATION

This application is based upon and claims the benefit of priority under 35 U.S.C. § 119 from Japanese Patent Application No. 2018-112439 filed on Jun. 13, 2018, the entire contents of which are incorporated herein by reference.

BACKGROUND

The present disclosure relates to an image signal detection device for detecting whether an input image signal is a specific moving image.

A frame rate converter for converting a frame rate of an image signal includes an interpolation frame generator for generating an interpolation frame to be interpolated between a pair of real frames. The frame rate converter includes a motion vector detection device for detecting motion of an image, and the interpolation frame generator generates an interpolation pixel at each pixel position constituting an interpolation frame, based on a motion vector.

When the motion vector detection device erroneously detects the motion vector, erroneous interpolation of the interpolation pixel occurs, and thus a visual discomfort (image quality deterioration) occurs in the interpolation frame. Thus, it is desirable that the motion vector detection device detects the motion vector with less erroneous detection, and the interpolation frame generator generates the interpolation frame with less image quality deterioration.

One of the specific moving images includes an animation moving image. Japanese Unexamined Patent Application Publication No. 2008-78857 discloses the prevention of image quality deterioration of an interpolation frame by, when the genre of an input image signal is an animation moving image, setting a motion vector detected by a motion vector detection device to 0.

SUMMARY

In order for a motion vector detection device to detect a motion vector with less erroneous detection, and for an interpolation frame generator to generate an interpolation frame with less image quality deterioration, it is necessary to determine features of an input image signal itself and detect whether the image signal is a specific moving image.

An aspect of one or more embodiments provides an image signal detection device including: a first motion vector detecting unit configured, based on a first frame and a second frame that is one frame before the first frame, which are each a frame of an input image signal, to detect a first motion vector indicating motion of an image between the first frame and the second frame, for each block including a plurality of pixels of the image signal, and to calculate a first matching error that is an index indicating a degree of pixel difference between blocks when a block in the second frame is moved to the first frame by the first motion vector; a second motion vector detecting unit configured, based on the second frame and a third frame that is one frame before the second frame, to detect a second motion vector indicating motion of an image between the second frame and the third frame, for the each block, and to calculate a second matching error that is an index indicating a degree of pixel difference between blocks when a block in the third frame is moved to the second frame by the second motion vector; a local determining unit configured to determine whether a discontinuously moving object is present in a continuously moving background by determining, for the each block, whether an absolute difference value between the first motion vector and the second motion vector is larger than a first threshold value, whether the first matching error is larger than a second threshold value, and whether the second matching error is smaller than a third threshold value; an integrating unit configured to integrate a determination value for the each block by the local determining unit within a frame; and a determining unit configured to determine whether the image signal is a specific moving image in which the discontinuously moving object is present in the continuously moving background, based on a pattern of integrated values of at least two frames by the integrating unit.

BRIEF DESCRIPTION OF THE DRAWINGS

FIG. 9 is a diagram illustrating operations of an image signal detection device according to a third embodiment, when an image signal in which an animation moving image is composed of 24 frames per second and an animation character is composed of 12 frames per second is input.

FIG. 10 is a diagram illustrating operations of an image signal detection device according to a third embodiment, when an image signal in which an animation moving image is composed of 24 frames per second and an animation character is composed of 8 frames per second is input.

DETAILED DESCRIPTION

Hereinafter, an image signal detection device according to each embodiment will be described with reference to the accompanying drawings. In each embodiment, an animation moving image is provided as an example of a specific moving image, and the image signal detection device determines features of an input image signal itself, and detects whether the image signal is an animation moving image.

First Embodiment

Figure 2:
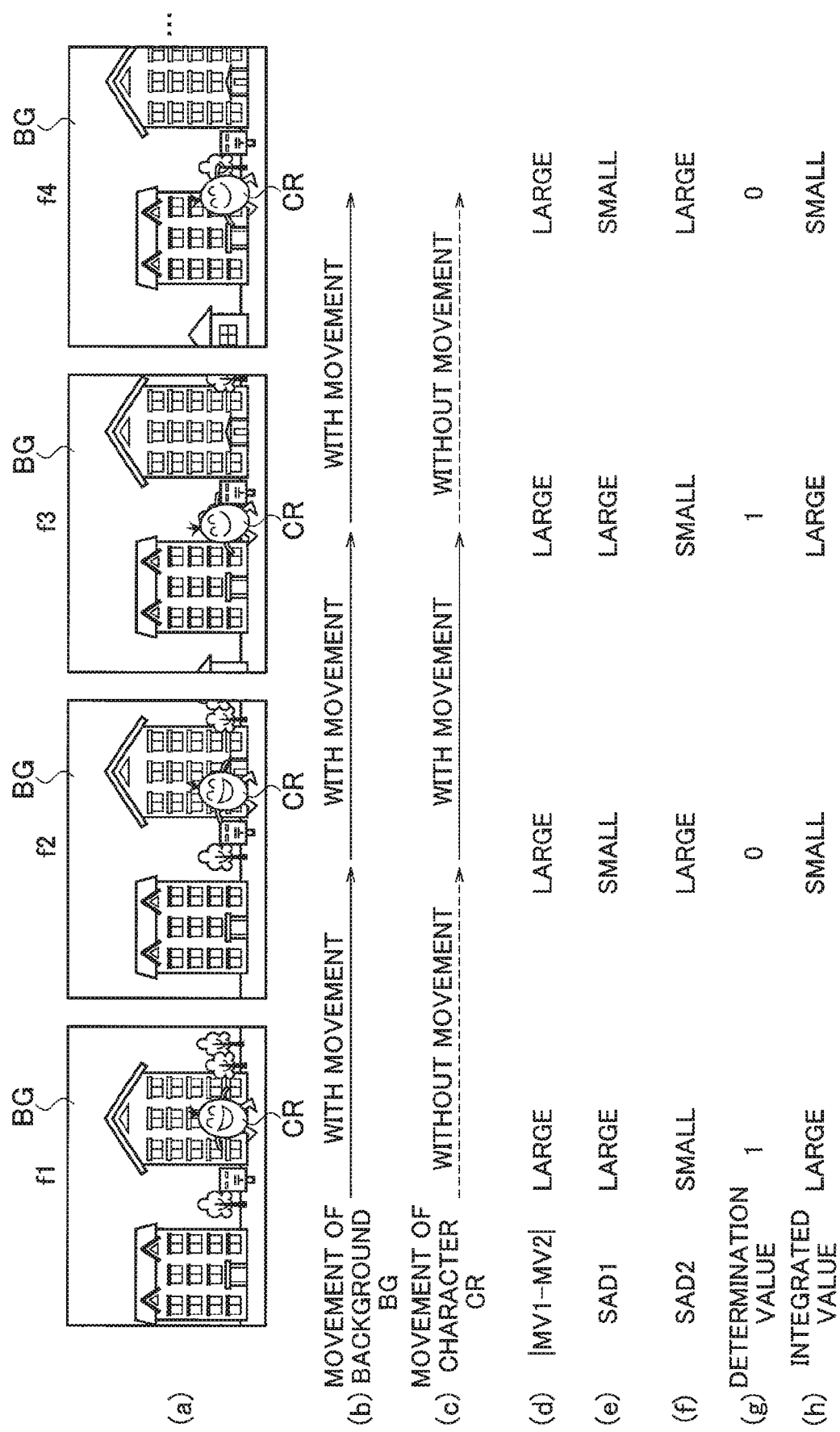
FIG. 2 is a diagram illustrating operations of an image signal detection device according to first and second embodiments, when an image signal in which an animation moving image is composed of 24 frames per second and an animation character is composed of 12 frames per second is input.

First, features of an animation moving image will be described with reference to FIG. 2. In FIG. 2, (a) shows frames f1 to f4 of the animation moving image, (b) shows a state of motion of a background BG between adjacent frames, and (c) shows a state of motion of an animation character CR (hereinafter, abbreviated to a character CR) between adjacent frames.

As illustrated in (a) to (c) of FIG. 2, the animation moving image has features that the background BG continuously moves at an almost uniform speed for each frame whereas the character CR present in the background BG does not continuously move, but there may be a case where the character CR moves between adjacent frames, and a case where the character CR does not move between adjacent frames. In the example of FIG. 2, the animation moving image is composed of 24 frames per second and the character CR is composed of 12 frames per second.

Figure 1:
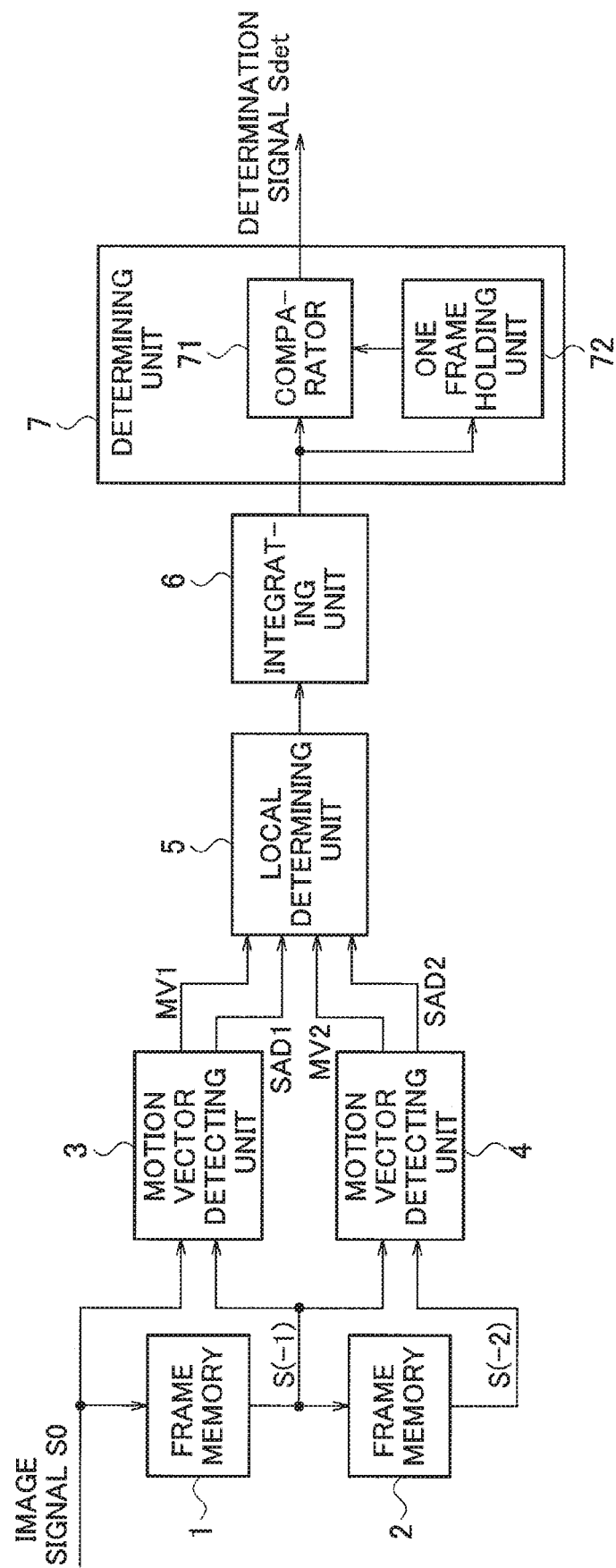
FIG. 1 is a block diagram of an image signal detection device according to a first embodiment.

The configuration and operations of an image signal detection device according to a first embodiment will be described with reference to FIG. 1. In FIG. 1, an image signal S0 is supplied to a frame memory 1 and a motion vector detecting unit 3. The frame memory 1 delays the input image signal S0 by one frame period and supplies an image signal S(−1) of one frame delay to a frame memory 2 and the motion vector detecting units 3 and 4. The frame memory 2 further delays the input image signal S(−1) by one frame period and supplies an image signal S(−2) of a two frame delay to the motion vector detecting unit 4.

When a frame of the image signal S0 is a current frame (first frame), a frame of the image signal S(−1) is a frame (second frame) that is one frame before the first frame, and a frame of the image signal S(−2) is a frame (third frame) that is two frames before the first frame.

The motion vector detecting unit 3 detects motion of an image of the current frame from the frame that is one frame before, based on the image signals S0 and S(−1), and generates a motion vector MV1 (first motion vector) indicating the motion of the image. Specifically, the motion vector detecting unit 3 detects, as the motion vector MV1, a direction in which a difference between a block including a plurality of pixels in the image signal S0 and a block including a plurality of pixels in the image signal S(−1) is the smallest. One block includes 64 pixels of 8 horizontal pixels and 8 vertical pixels, for example.

Figure 3:
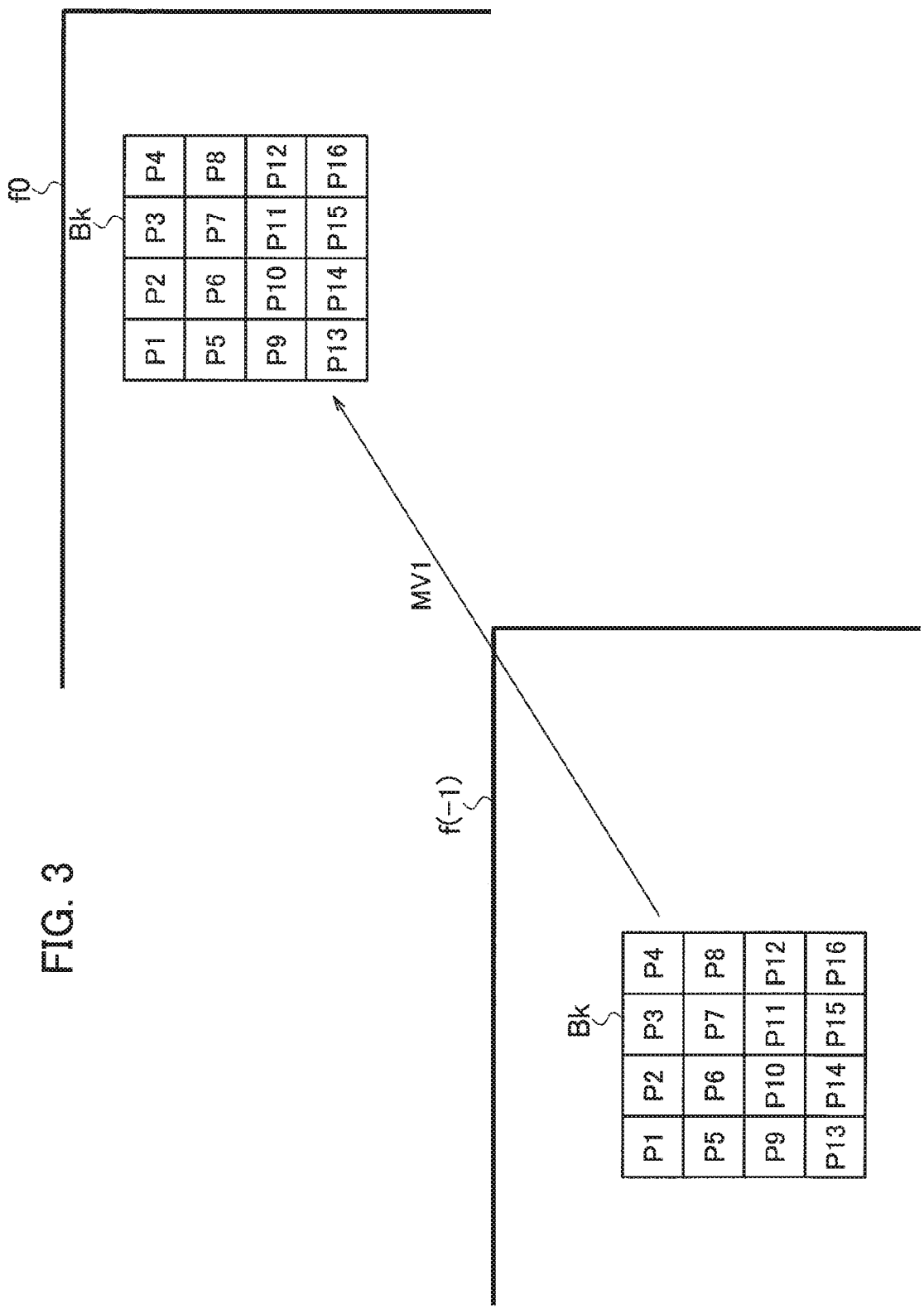
FIG. 3 is a diagram for describing a matching error between blocks.

In addition, the motion vector detecting unit 3 calculates a matching error SAD1 (first matching error) between blocks that generated the motion vector MV1. In FIG. 3, due to simplicity, one block includes 16 pixels of 4 horizontal pixels and 4 vertical pixels. As illustrated in FIG. 3, the motion vector detecting unit 3 calculates the matching error SAD1 between a block BK in a frame f(−1) of the image signal S(−1) and a block BK in a frame f0 of the image signal S0.

The block Bk in the frame f0 is a block obtained by moving the block Bk in the frame f(−1) to the frame f0 by the motion vector MV1. The matching error SAD1 is a total of absolute values of differences of pixels at the same positions in pixels P1 to P16 between the two blocks Bk.

The matching error SAD1 may be a total of absolute values of differences of some pixels selected according to a predetermined rule or randomly, instead of the total of the absolute values of all pixels between the two blocks Bk. The matching error SAD1 is not limited to the total (or sum) of the absolute values, and may be a total of square values, a statistical value such as an average value of absolute values or square values or the like, the number of pixels when square values are less than a predetermined threshold value, or the like. The matching error SAD1 may be an index indicating the degree of pixel difference between the two blocks Bk that generated the motion vector MV1.

The motion vector detecting unit 3 supplies the motion vector MV1 and the matching error SAD1 to a local determining unit 5.

Similarly, the motion vector detecting unit 4 detects motion of an image of the frame that is one frame before, from the frame that is two frames before, based on the image signals S(−1) and S(−2), and generates a motion vector MV2 (second motion vector). In addition, the motion vector detecting unit 4 calculates a matching error SAD2 (second matching error) between blocks that generated the motion vector MV2. The motion vector detecting unit 4 supplies the motion vector MV2 and the matching error SAD2 to the local determining unit 5.

In the animation moving image illustrated in FIG. 2, since the background BG is moving at an almost uniform speed, a difference between the motion vector MV1 and the motion vector MV2 in the background BG between adjacent frames is almost 0. Meanwhile, when the character CR does not move between adjacent frames, a difference between the motion vector MV1 and the motion vector MV2 in the character CR is almost 0. When the character CR moves between adjacent frames, a difference between the motion vector MV1 and the motion vector MV2 in the character CR has a predetermined magnitude.

Thus, in the entire frame, an absolute value of the difference between the motion vector MV1 and the motion vector VC2 between adjacent frames continues to be larger than a threshold value th1.

In the background BG, since the image simply moves in parallel, the matching error SAD1 and the matching error SAD2 are almost 0. Meanwhile, when the character CR moves between adjacent frames, since the image does not simply move in parallel at a boundary portion of the background BG and the character CR, the image does not match between frames and the matching error SAD1 and the matching error SAD2 have a large value. Accordingly, as shown in (e) of FIG. 2, the matching error SAD1 alternately repeats a state of being larger than a threshold value th2 and a state of being smaller than the threshold value th2. As shown in (f) of FIG. 2, the matching error SAD2 alternately repeats a state of being larger than a threshold value th3 and a state of being smaller than the threshold value th3. The threshold value th2 and the threshold value th3 may have a same value.

In FIG. 1, the local determining unit 5 outputs a determination value "1" when conditions that the absolute difference value between the motion vector MV1 and the motion vector MV2 is larger than the threshold value th1 (a first threshold value), the matching error SAD1 is larger than the threshold value th2 (a second threshold value), and the matching error SAD2 is smaller than the threshold value th3 (a third threshold value) are satisfied in each block Bk in a frame. The local determining unit 5 outputs a determination value "0" when the conditions are not satisfied.

The fact that a determination value generated by the local determination unit 5 changes between "1" and "0" means that a discontinuously moving object, such as the character CR, is present in the continuously moving background BG. As shown in (g) of FIG. 2, the determination value generated by the local determination unit 5 alternately repeats "1" and "0" at a boundary portion between the background BG and the character CR.

An integrating unit 6 integrates the determination values output by the local determining unit 5 in each frame. As shown in (h) of FIG. 2, an integrated value in a frame is larger than a threshold value th4 in a frame in which the character CR moved compared with a frame immediately before, and is smaller than the threshold value th4 in a frame in which the character CR is not moved.

The integrating unit 6 supplies the integrated value to a comparator 71 and a one frame holding unit 72 of a determining unit 7. The one frame holding unit 72 holds the input integrated value for a one frame period and supplies the integrated value to the comparator 71. A latest integrated value is input to the comparator 71. The comparator 71 compares an integrated value of the current frame supplied from the integrating unit 6 and an integrated value of the frame that is one frame before being supplied from the one frame holding unit 72.

Upon detecting that the integrated value is changed from a state of being larger than the threshold value th4 to a state of being smaller than the threshold value th4 or from the state of being smaller than the threshold value th4 to the state of being larger than the threshold value th4, the comparator 71 outputs, as a determination signal Sdet, a first determination value indicating that the image signal S0 is an animation moving image. For example, the first determination value may be a value "1". When a difference of integrated values of two adjacent frames is equal to or larger than a predetermined threshold value, the comparator 71 may determine that the integrated value is changed from a large value to a small value or vice versa.

Upon detecting a state other than the above based on a comparison result, the comparator 71 outputs, as the determination signal Sdet, a second determination value indicating that the input signal S0 is a general moving image instead of the animation moving image. For example, the second determination value may be a value "0".

The operations of the image signal detection device, according to a first embodiment will be described again with reference to a flowchart of FIG. 4. The image signal detection device of a first embodiment may be configured as hardware (a circuit) or as software (a computer program). The flowchart illustrated in FIG. 4 may be processes of executing a computer program in a central processing unit (CPU) of a computer. The computer program is stored in a non-transitory storage medium, loaded in a main memory, and executed by the CPU.

Figure 4:
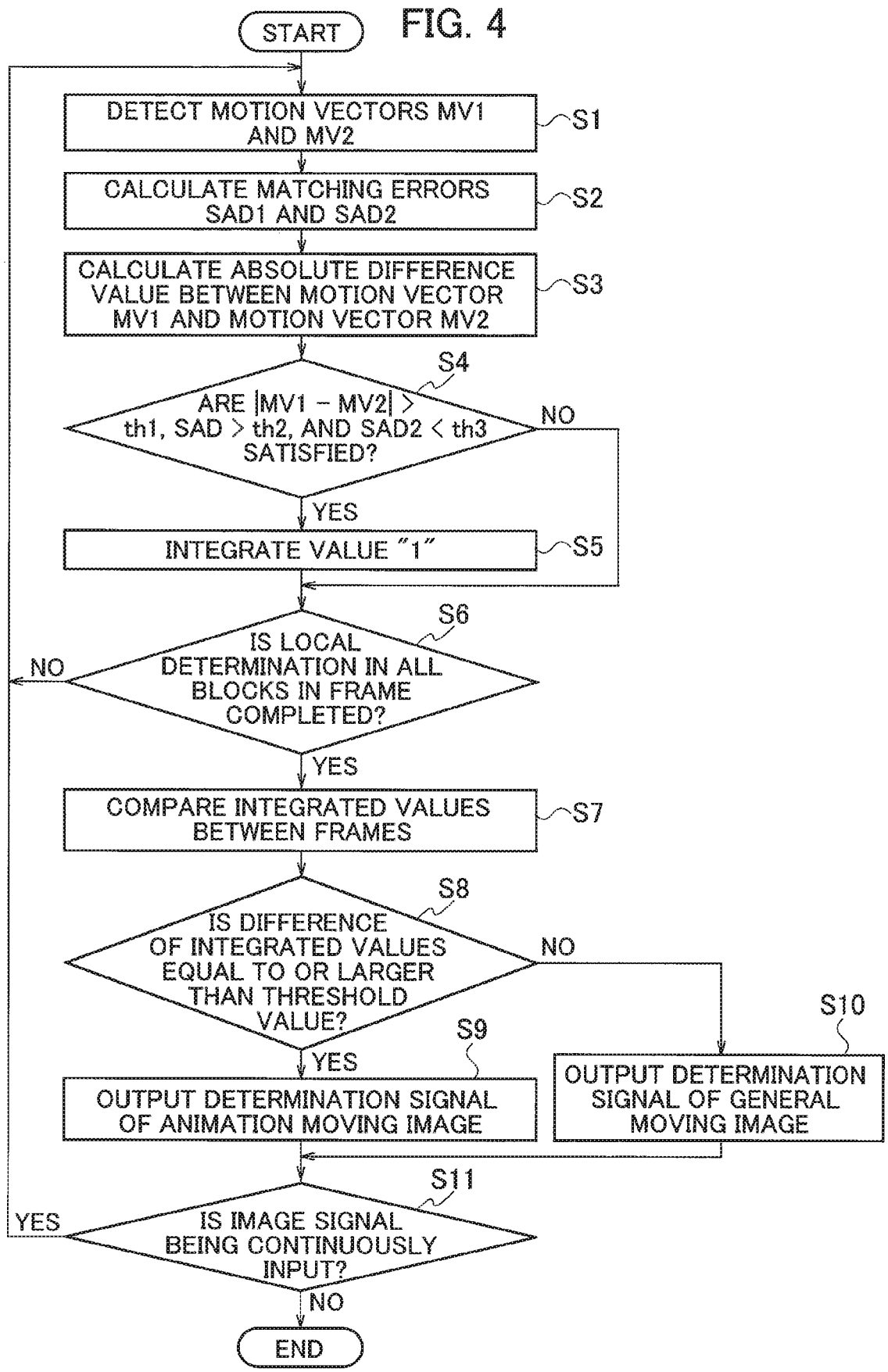
FIG. 4 is a flowchart illustrating operations of an image signal detection device according to a first embodiment.

In FIG. 4, when the image signal S0 is input and processing is started, the image signal detection device detects the motion vectors MV1 and MV2 in step S1. The image signal detection device calculates the matching errors SAD1 and SAD2 in step S2. The image signal detection device calculates the absolute difference value between the motion vector MV1 and the motion vector MV2 in step S3.

The image signal detection device determines whether the conditions that the absolute difference value is larger than the threshold value th1, the matching error SAD1 which is larger than the threshold value th2, and the matching error SAD2 which is smaller than the threshold value th3 are satisfied, in step S4. When the conditions are satisfied (YES), the image signal detection device integrates a value "1" in step S5. When the conditions are not satisfied (NO) or in continuation of step S5, the image signal detection device determines whether local determination in all blocks in a frame is completed in step S6.

When the local determination in all blocks in the frame is not completed (NO), the image signal detection device repeats the processing of steps S1 to S6. When the local determination in all blocks in the frame is completed (YES), the image signal detection device compares the integrated values between frames in step S7. The image signal detection device determines whether the difference of integrated values is equal to or larger than a threshold value in step S8.

When the difference of integrated values is equal to or larger than the threshold value (YES), the image signal detection device outputs, as the determination signal Sdet, the first determination value indicating that the image signal S0 is the animation moving image in step S9. When the difference integrated values is not equal to or larger than the threshold value (NO), the image signal detection device outputs, as the determination signal Sdet, the second determination value indicating that the image signal S0 is a general moving image instead of the animation moving image in step S10.

In step S11, the image signal detection device determines whether the image signal S0 is being continuously input. When the image signal S0 is being continuously input (YES), the image signal detection device repeats the processing of step S1 to S11. When the image signal S0 is not being continuously input (NO), the image signal detection device ends the processing.

Second Embodiment

In a first embodiment, it is detected whether the image signal S0 is the animation moving image, based on a pattern of integrated values in two adjacent frames output from the integrating unit 6. In a second embodiment, in order to reduce erroneous detection, it is detected whether the image signal S0 is the animation moving image, based on a pattern of integrated values of at least three frames.

Figure 5:
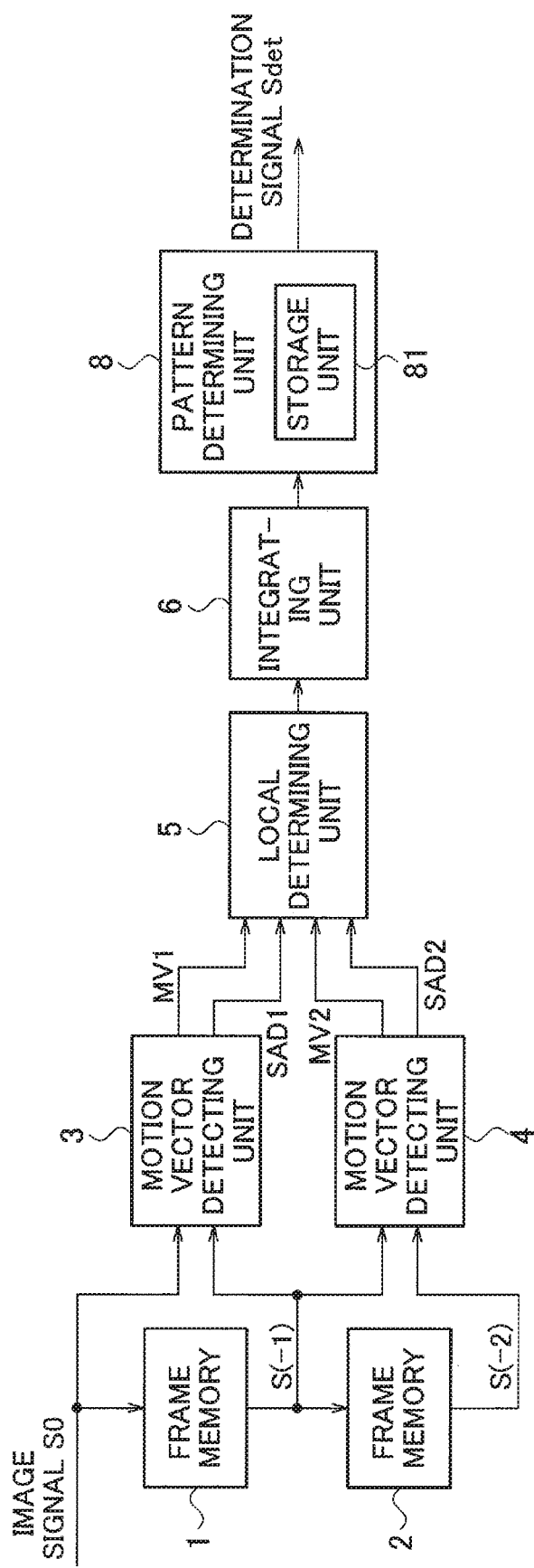
FIG. 5 is a block diagram of an image signal detection device according to a second embodiment.

As illustrated in FIG. 5, the image signal detection device according to a second embodiment includes a pattern determining unit 8 instead of the determining unit 7. The pattern determining unit 8 includes a storage unit 81, and stores integrated values output from the integrating unit 6 by at least three frames. For example, when determination is performed in three frames, the pattern determining unit 8 outputs the first determination value as the determination signal Sdet when the integrated value changes such as (large, small, and large), or (small, large, and small), compared with the threshold value th4.

When the determination is performed in four frames, the pattern determining unit 8 outputs the first determination value as the determination signal Sdet when the integrated value changes such as (large, small, large, and small), or (small, large, small, and large), compared with the threshold value th4.

When a pattern other than the above pattern is determined, the pattern determining unit 8 outputs the second determination value as the determination signal Sdet.

In first and second embodiments described above, the operation in which the animation moving image is an animation moving image (a first animation moving image) composed of 24 frames per second, in which a character CR is composed of 12 frames per second is described. However, there may be an animation moving image (a second animation moving image) in which a character CR is composed of 8 frames.

The image signal detection device according to a second embodiment is suitable for detecting both the animation moving image in which the character CR is composed of 12 frames per second and the animation moving image in which the character CR is composed of 8 frames. Operations of the image signal detection device according to a second embodiment where the character CR is composed of 8 frames will be described with reference to FIG. 6.

Figure 6:
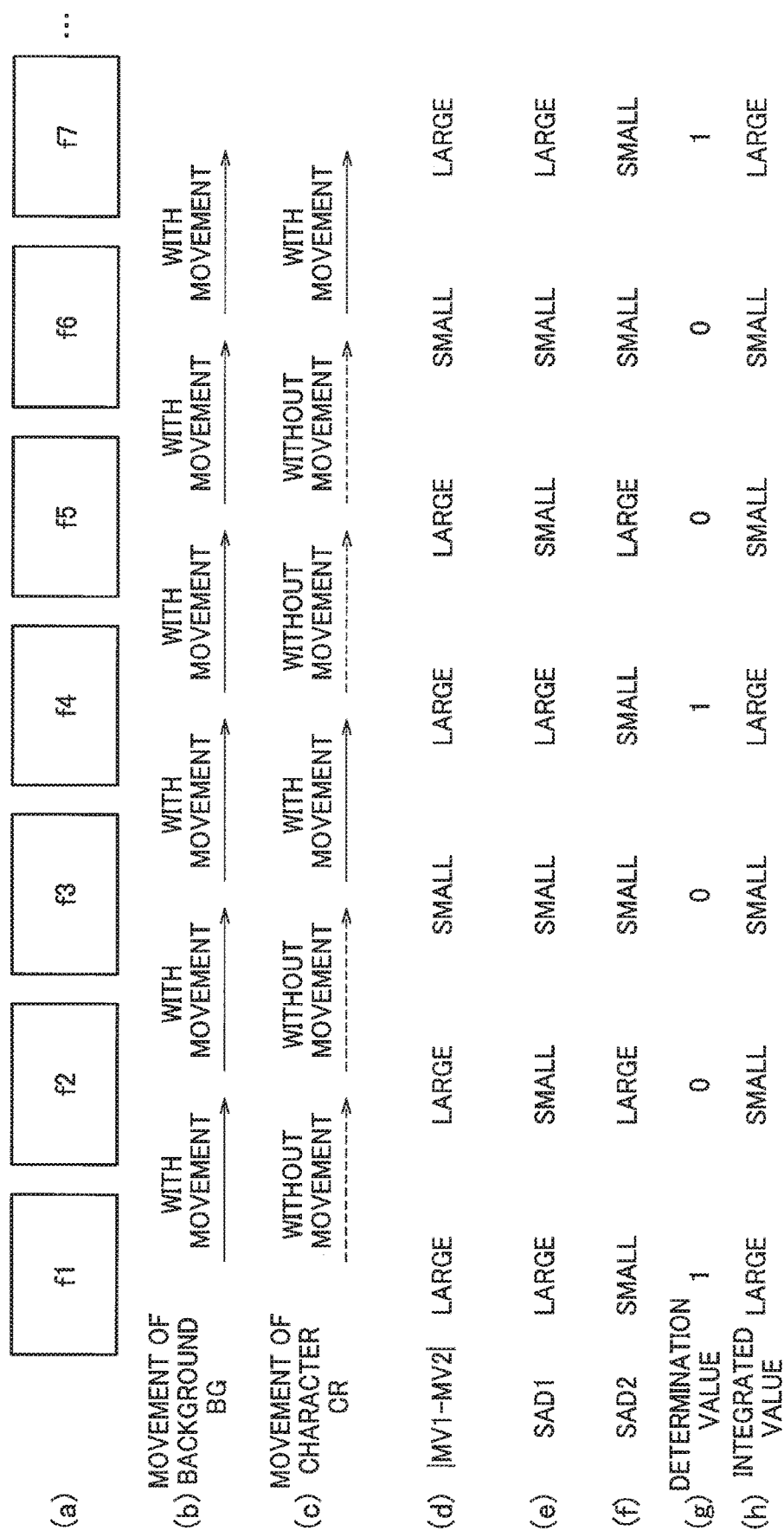
FIG. 6 is a diagram illustrating operations of an image signal detection device according to first and second embodiments, when an image signal in which an animation moving image is composed of 24 frames per second and an animation character is composed of 8 frames per second is input.

In FIG. 6, (a) shows frames f1 through f7 of an animation moving image. The background BG shown in (b) of FIG. 6 is moving at an almost uniform speed, and the character CR shown in (c) of FIG. 6 is moving in only one frame among three frames. In this case, as shown in (d) of FIG. 6, the absolute difference value between the motion vector MV1 and the motion vector MV2 is smaller than the threshold value th1 in the frames f3, f6, and so on. The absolute difference value has a pattern repeating large, large, and small, compared with the threshold value th1.

As shown in (e) of FIG. 6, the matching error SAD1 has a pattern repeating large, small, and small, compared with the threshold value th2, and as shown in (f) of FIG. 6, the matching error SAD2 has a pattern repeating small, large, and small, compared with the threshold value th3.

In FIG. 5, the local determining unit 5 outputs a determination value "1" when conditions that the absolute difference value between the moving vector MV1 and the moving vector MV2 is larger than the threshold value th1, the matching error SAD1 which is larger than the threshold value th2, and the matching error SAD2 which is smaller than the threshold value th3 are satisfied in each block Bk in a frame. The local determining unit 5 outputs a determination value "0" when the conditions are not satisfied.

As shown in (g) of FIG. 6, the determination value output from the local determining unit 5 has a pattern repeating "1", "0", and "0" at the boundary portion between the background BG and the character CR. Accordingly, as shown in (h) of FIG. 6, an integrated value output from the integrating unit 6 has a pattern repeating large, small, and small, compared with the threshold value th4.

When the determination is performed in four frames, the pattern determining unit 8 outputs, as the determination signal Sdet, the first determination value indicating that the image signal S0 is the animation moving image in which the character CR is composed of 8 frames, when the integrated value changes such as (large, small, small, and large), (small, small, large, and small), or (small, large, small, and small), compared with the threshold value th4.

The pattern determining unit 8 outputs, as the determination signal Sdet, the first determination value indicating that the image signal S0 is the animation moving image in which the character CR is composed of 12 frames, when the integrated value changes such as (large, small, large, and small), or (small, large, small, and large), compared with the threshold value th4. At this time, the first determination value indicating the animation moving image in which the character CR is composed of 8 frames and the first determination value indicating the animation moving image in which the character CR is composed of 12 frames have different values.

In order to reduce erroneous detection, it may be determined whether the image signal S0 is an animation moving image, whether the image signal S0 is an animation moving image in which the character CR is composed of 12 frames, or whether the image signal S0 is an animation moving image in which the character CR is composed of 8 frames, based on a pattern of integrated values of 5 frames or more.

Figure 7:
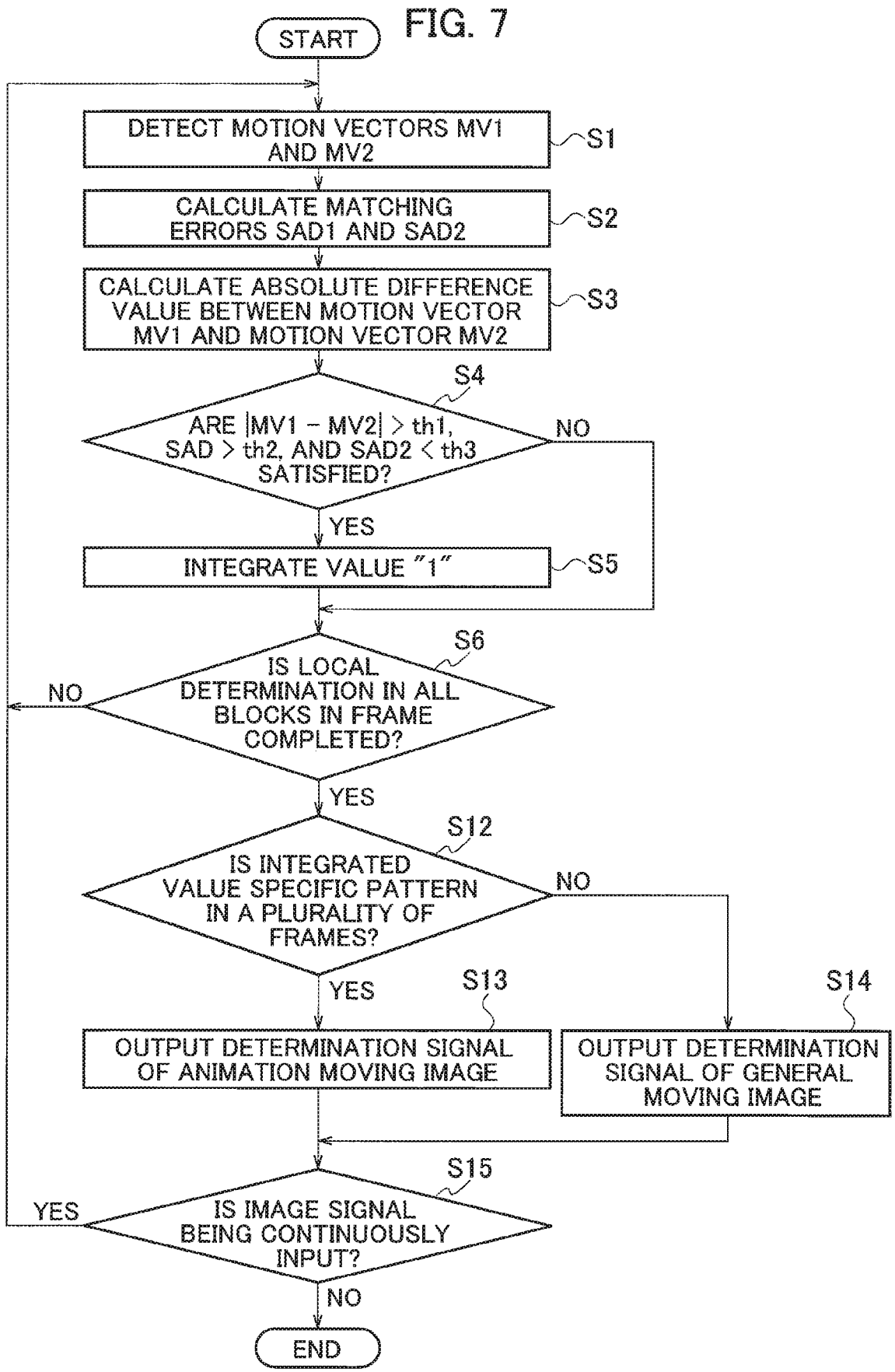
FIG. 7 is a flowchart illustrating operations of an image signal detection device according to a second embodiment.

The operations of the image signal detection device according to a second embodiment will be described again with reference to a flowchart of FIG. 7. As the above, the flowchart of FIG. 7 may be processes of executing a computer program in a central processing unit (CPU) of a computer. In FIG. 7, steps S1 to S6 are the same as steps S1 to S6 of FIG. 4.

In FIG. 7, the image signal detection device determines whether the integrated value is a specific pattern in a plurality of frames, in step S12. When the integrated value is the specific value in a plurality of frames (YES), the image signal detection device outputs, as the determination signal Sdet, the first determination value indicating that the image signal S0 is the animation moving image, in step S13. When the integrated value is not the specific pattern in a plurality of frames (NO), the image signal detection device outputs, as the determination signal Sdet, the second determination value indicating that the image signal S0 is a general moving image instead of the animation moving image, in step S14.

In step S15, the image signal detection device determines whether the image signal S0 is being continuously input. When the image signal S0 is being continuously input (YES), the image signal detection device repeats the processing of step S1 to S6 and S12 to S15. When the image signal S0 is not being continuously input (NO), the image signal detection device ends the processing.

Third Embodiment

In first and second embodiments described above, operations in which the animation moving image of 24 frames per second is input to the image signal detection device as the image signal S0 is described. There may be a case where the animation moving image of 24 frames per second is set to an image signal of 60 frames per second via 2-3 pull-down. An image signal detection device of a third embodiment is configured to detect whether the image signal S0 is an animation moving image when the 2-3 pull-down converted image signal S0 is input.

Figure 8:
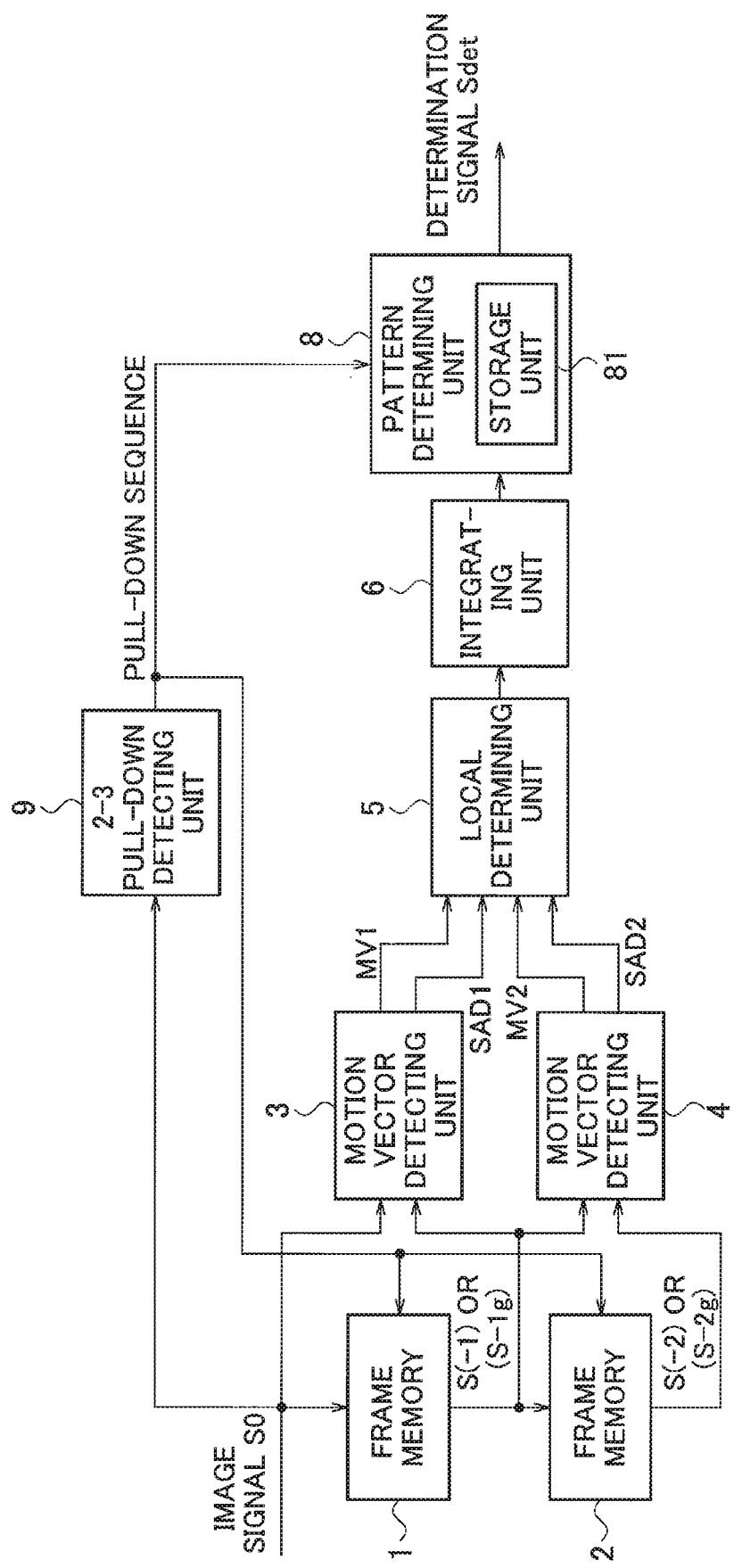
FIG. 8 is a block diagram of an image signal detection device according to a third embodiment.

In FIG. 8, the same parts as those of FIG. 5 are denoted by the same reference numerals, and details thereof may be omitted. As illustrated in FIG. 8, the image signal detection device of a third embodiment includes a 2-3 pull-down detecting unit 9 configured to detect whether the input image signal S0 is a 2-3 pull-down converted image signal and output a pull-down sequence when the image signal S0 is the 2-3 pull-down converted image signal. The 2-3 pull-down detecting unit 9 supplies the pull-down sequence to the pattern determining unit 8 and the frame memories 1 and 2.

The frame memories 1 and 2 in FIG. 8 include a plurality of frame memories. As will be described later, the 2-3 pull-down converted image signal S0 alternately repeats a state in which frames having the same image content are consecutive in three frames and a state in which frames having the same image content are consecutive in two frames. In order for the motion vector detecting units 3 and 4 to detect motion of an image of the 2-3 pull-down converted image signal S0, frames in adjacent frame groups need to be compared when two frames or three frames having the same image content are set as a frame group.

The frame memories 1 and 2 may include a plurality of frame memories required by the motion vector detecting units 3 and 4 to detect the motion of the image of the 2-3 pull-down converted image signal S0. Specifically, the frame memories 1 and 2 include five frame memories so as to detect the motion of the image in each frame of the image signal S0. When the motion of the image is to be detected in a frame at the timing when the image content of the image signal S0 is changed, the frame memories 1 and 2 may include four frame memories.

When the 2-3 pull-down detecting unit 9 detects that the input image signal S0 is not a 2-3 pull-down converted image signal, the frame memories 1 and 2 respectively output the image signal S(−1) of a one frame delay and the image signal S(−2) of a two frame delay. In this case, operations of the image signal detection device according to a third embodiment are the same as those of the image signal detection device according to a second embodiment.

A frame group including a current frame of the image signal S0 is referred to as a first frame group, a frame group immediately before the first frame group is referred to as a second frame group, and a frame group immediately before the second frame group is referred to as a third frame group. When the 2-3 pull-down detecting unit 9 detects that the input image signal S0 is a 2-3 pull-down converted image signal, the frame memory 1 outputs an image signal S(−1g) that is a frame in the second frame group and the frame memory 2 outputs an image signal S(−2g) that is a frame in the third frame.

The motion vector detecting unit 3 calculates the motion vector MV1 and the matching error SAD1, based on the image signal S0 that is the frame in the first frame group and the image signal S(−1g) that is the frame in the second frame group. The motion vector detecting unit 4 calculates the motion vector MV2 and the matching error SAD2, based on the image signal S(−1g) that is the frame in the second frame and the image signal S(−2g) that is the frame in the third frame group.

FIG. 9 illustrates operations when the image signal S0 obtained by performing 2-3 pull-down conversion on an animation moving image of 24 frames per second, in which the character CR is composed of 12 frames, is input to the image signal detection device of FIG. 8. As illustrated in (a) of FIG. 9, the image signal S0 alternately repeats a state in which frames of same image content are consecutive in three frames and a state in which frames of the same content are consecutive in two frames.

In frames illustrated in (a) of FIG. 9, "A", "B", "C", "D", and "E" indicate image content. For example, frames f1 to f3 are the same frames having image content "A" and frames 4 and 5 are the same frames having image content "B".

As illustrated in (b) of FIG. 9, the 2-3 pull-down detecting unit 9 outputs a pull-down sequence counting up to a value "4" in accordance with the progress of frames, wherein a value of an initial frame of two consecutive frames is "0", for example.

In each frame, the motion vectors MV1 and MV2 and the matching errors SAD1 and SAD2 are input to the local determining unit 5. As in a second embodiment, the local determining unit 5 generates the determination value "1" or "0" in each block Bk of each frame, and the integrating unit 6 integrates the determination values in each frame.

In order to detect whether the image signal S0 is an animation moving image, it is necessary to determine the motion vectors MV1 and MV2, and the matching errors SAD1 and SAD2 in frames in which pull-down sequences indicate a value "0" and a value "2".

Then, the storage unit 81 stores only the integrated values of the frames in which the pull-down sequences indicate the value "0" and the value "2", based on the input pull-down sequence. As in a second embodiment, the pattern determining unit 8 outputs the first determination value as the determination signal Sdet, based on a pattern of the integrated values of the frames in which the pull-down sequences indicate the value "0" and the value "2". In this case as well, the determination signal Sdet may indicate the animation moving image in which the character CR is composed of 12 frames.

FIG. 10 illustrates operations when the image signal S0 obtained by performing 2-3 pull-down conversion on an animation moving image of 24 frames per second, in which the character CR is composed of 8 frames, is input to the image signal detection device of FIG. 8.

In this case as well, the pattern determining unit 8 outputs the first determination value as the determination signal Sdet, based on the pattern of the integrated values in the frames in which the pull-down sequences indicate the value "0" and the value "2". Here as well, the determination signal Sdet may indicate the animation moving image in which the character CR is composed of 8 frames.

As described above, the image signal detection device according to a third embodiment may detect whether the image signal S0 is the animation moving image, based on a pattern of integrated values of two frames or three frames, in which the same image is continued, for example, at least two frames when focusing on an initial frame. The image signal detection device according to a third embodiment may not only focus on the initial frame, but may focus on any one of two frames or three frames, in which the same image is continued.

In FIG. 8, the pattern determining unit 8 configured to determine whether the image signal S0 is an image signal in which the character CR is composed of 12 frames or 8 frames, based on a pattern of integrated values of 3 frames in at least 3 frame groups, is provided. When only the animation moving image in which the character CR is composed of 12 frames is to be detected, the determining unit 7, configured to determine whether the image signal S0 is an animation moving image, based on a pattern of integrated values of two frames in two frame groups, may be provided as in a first embodiment, instead of the pattern determining unit 8.

As described above, according to the image signal detection device according to first through third embodiment, it is possible to determine features of an input signal itself and detect whether the input signal is a specific moving image.

The present invention is not limited to first through third embodiments described above, and various modifications may be made without departing from the scope of the present invention. The specific moving image in which a discontinuously moving object is present in a continuously moving background is not limited to the animation moving image.

What is claimed is:

1. An image signal detecting device comprising:
a first motion vector detecting unit configured, based on a first frame and a second frame that is one frame before the first frame, which are each a frame of an input image signal, to detect a first motion vector indicating motion of an image between the first frame and the second frame, for each block including a plurality of pixels of the image signal,
and to calculate a first matching error that is an index indicating a degree of pixel difference between blocks when a block in the second frame is moved to the first frame by the first motion vector;
a second motion vector detecting unit configured, based on the second frame and a third frame that is one frame before the second frame, to detect a second motion vector indicating motion of an image between the second frame and the third frame, for each block,
and to calculate a second matching error that is an index indicating a degree of pixel difference between blocks when a block in the third frame is moved to the second frame by the second motion vector;
a local determining unit configured to determine whether a discontinuously moving object is present in a continuously moving background by determining, for the each block, whether an absolute difference value between the first motion vector and the second motion vector is larger than a first threshold value, whether the first matching error is larger than a second threshold value, and whether the second matching error is smaller than a third threshold value;

an integrating unit configured to integrate a determination value for the each block by the local determining unit within a frame; and a determining unit configured to determine whether the image signal is a specific moving image in which the discontinuously moving object is present in the continuously moving background, based on a pattern of integrated values of at least two frames by the integrating unit.

2. The image signal detection device according to claim 1, wherein the determining unit includes a comparator configured to compare integrated values of two frames, and determines whether the input image is the specific moving image, based on a result of comparing magnitude of the integrated values of the two frames by the comparator.

3. The image signal detection device according to claim 1, wherein the determining unit is a pattern determining unit configured, based on a pattern of integrated values of at least three frames, to determine whether the image signal is composed of 24 frames per second and is a first animation moving image in which an animation character is composed of 12 frames per second or whether the image signal is composed of 24 frames per second and is a second animation moving image in which an animation character is composed of 8 frames per second.

4. The image signal detection device according to claim 1, further comprising a 2-3 pull down detecting unit configured to detects whether the image signal is a 2-3 pull-down converted image signal in which 24 frames per second are converted to 60 frames per second, and when the image signal is the 2-3 pull-down converted image signal, detect a pull-down sequence, wherein when the 2-3 pull-down detecting unit detects that the image signal is the 2-3 pull-down converted image signal, the first motion vector detecting unit calculates the first motion vector and the first matching error, based on a frame in a first frame group and a frame in a second frame group immediately before the first frame group, when two or three frames having same image content are set as a frame group, the second motion vector detecting unit calculates the second motion vector and the second matching error, based on a frame in the second frame group and a frame in a third frame group immediately before the second frame group, and the determining unit determines whether the image signal is the specific moving image, based on a pattern of integrated values of two frames in at least two frame groups.

5. The image signal detection device according to claim 4, wherein the determining unit determines, based on a pattern of integrated values of three frames in at least three frame groups, whether the image signal is a 2-3 pull-down converted image signal in which a first animation moving image where an animation character is composed of 12 frames per second among 24 frames per second is converted to 60 frames per second or a 2-3 pull-down converted image signal in which a second animation moving image where an animation character is composed of 8 frames per second among 24 frames per second is converted to 60 frames per second.

\* \* \* \* \*